United States Patent [19]

Cartier et al.

[11] Patent Number: 4,654,179

[45] Date of Patent: Mar. 31, 1987

[54] POLYVINYL BUTYRAL SHEET ROUGHNESS CONTROL

[75] Inventors: George E. Cartier, Springfield; Peter H. Farmer, Longmeadow, both of Mass.

[73] Assignee: Monsanto Company, St. Louis, Mo.

[21] Appl. No.: 751,115

[22] Filed: Jul. 2, 1985

[51] Int. Cl.[4] ............................ C08J 3/00; B29B 13/00
[52] U.S. Cl. ................................. 264/176.1; 264/211; 264/216; 264/331.22; 425/224; 525/61
[58] Field of Search ............... 264/211, 236, 347, 216, 264/176 R, 175, 331.22; 425/224; 525/61

[56] References Cited

U.S. PATENT DOCUMENTS

| | | | |
|---|---|---|---|
| 2,318,469 | 5/1943 | Derby et al. | 425/224 |
| 2,432,242 | 12/1947 | Leekley | 264/175 |
| 2,455,198 | 11/1948 | Vaala | 264/175 |
| 2,487,864 | 11/1949 | Gaylor | 28/82 |
| 2,904,844 | 9/1959 | Smithies | 264/211 |
| 2,909,810 | 10/1959 | Jensch | 264/284 |
| 3,101,991 | 8/1963 | Fukushima et al. | 264/176 R |
| 3,137,675 | 6/1964 | Matsubayashi et al. | 264/178 F |
| 3,963,618 | 6/1976 | Muir | 525/61 |
| 4,515,745 | 5/1985 | Churma et al. | 264/211 |

FOREIGN PATENT DOCUMENTS 34389   4/1975   Japan ........................ 525/61

*Primary Examiner*—Jeffery Thurlow
*Attorney, Agent, or Firm*—Michael J. Murphy; William J. Farrington

[57] ABSTRACT

Extruded polyvinyl butyral (PVB) sheet roughness is controlled by use of PVB resin lightly cross-linked through stable intermolecular linkages.

13 Claims, No Drawings

POLYVINYL BUTYRAL SHEET ROUGHNESS CONTROL

CROSS REFERENCE TO RELATED APPLICATION

"Cross-linked Polyvinyl Butyral", G. Cartier et al, Ser. No. 751,116, filed July 2, 1985.

BACKGROUND OF THE INVENTION

This invention relates to plasticized polyvinyl butyral (PVB) sheet usable in laminated safety glass assemblies and more particularly to a method of regulating the surface roughness of such a sheet.

Plasticized PVB sheet is very well known as an intermediate for use with glass or plastic panels (hereinafter called "laminating panel(s)") in laminated safety glass assemblies.

It is further known, as typically disclosed in U.S. Pat. No. 4,305,549, that the surface of the sheet should have a certain degree of roughness to facilitate deairing during preparation of a laminate. More specifically, channels between the smooth surface of the laminating panel and the extremities of minute valleys in the face of the rough surface of the opposing, contiguous PVB sheet permit air between the two members to escape when pressure or vacuum is applied to the interface. However, since deairing is carried out differently by various laminators, different levels of sheet roughness may be required from the sheet supplier. For example, if roughness is too low for a particular deairing process, the air evacuation channels may close down prematurely and the edges of the sheet will seal to the laminating panel before deairing is complete. On the other hand, if the channels are too deep, it may be difficult to remove all the air before the sheet surface flattens against the laminating panel with the result being undesirable air bubbles visually apparent in the finished glass laminate.

Different sheet roughness levels have been provided in the past by changing the surface configuration of die member(s) in the extrusion operation, but this is costly since it requires shutting down the extrusion process to change such die members. It would be desirable to provide a more tractable way to alter PVB sheet roughness.

SUMMARY OF THE INVENTION

Now improvements have been made in the manufacture of plasticized PVB sheet which minimize or overcome the aforementioned shortcomings of the prior art.

Accordingly, it is a principal object of this invention to facilitate control of extruded PVB sheet roughness by judiciously manipulating the molecular weight of the PVB from which the sheet is formed.

Another object is to manipulate such molecular weight by selective cross-linking of the PVB.

A further object is to provide lightly cross-linked PVB which, when formed into sheet, provides the desired degree of sheet roughness.

Other objects of this invention will be in part be obvious and will in part appear from the following description and claims.

These and other objects are accomplished by tailoring the molecular weight distribution of the PVB to provide a desired level of roughness in the extruded PVB sheet by selectively lightly cross-linking the PVB during its synthesis. Such lightly cross-linked PVB resin has unexpectedly been found, according to the present invention, to bear a direct relationship to the degree of roughness generated in the sheet surface formed from it during extrusion. More specifically, a method is provided for regulating the surface roughness of extruded, plasticized PVB sheet which comprises employing a PVB resin during extrusion which is lightly cross-linked through stable intermolecular linkages capable of surviving the sheet-shaping process and developed prior to extrusion. Roughness is regulated through the degree of PVB cross-linking preferably at between about $60 \times 10^{-5}$ and about $180 \times 10^{-5}$ in (152 to $457 \times 10^{-5}$ cm).

The cross-links in the PVB can be formed by any cross-linking agent with aldehydes having at least two CHO groups being preferred and glutaraldehyde most preferred.

DETAILED DESCRIPTION OF PREFERRED EMBODIMENTS

The PVB resin useful in the process of this invention for controlling the surface roughness of plasticized PVB sheet has the following representative formula for a section of polymer when employing glutaraldehyde as the cross-linking agent:

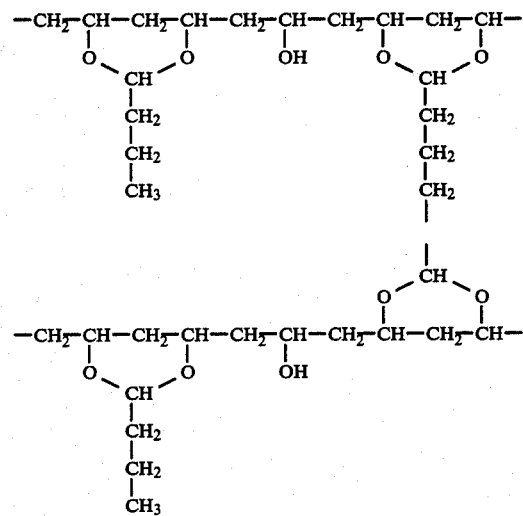

As depicted above, the PVB portion of the structure, which is present at a level of 65–95 weight percent of vinyl butyral units in the polymer, is formed through reaction of butyraldehyde with two adjacent hydroxyl groups on the same PVOH chain. The intermolecular cross-linkages (in this case diacetal cross-links) are fromed through reaction of one active group on the cross-linking agent (in this case aldehyde) with a pair of adjacent OH groups on one polyvinyl alcohol (PVOH) chain and another active group of the cross-linking agent (in this case also aldehyde) with such a pair of OH's on an adjacent, neighboring chain. By such cross-linking, the PVB molecular weight is conveniently increased in that one cross-link tying together two chains provides the same molecular weight as if two equivalent PVB chains were linked together end to end. The latter is thought to require a difficult synthesis of special high molecular weight PVOH's and polyvinyl acetate precursors. Yet because such cross-linking is light (to be later defined) and does not join all PVB chains in this manner, some chains being uncross-linked and in the form of conventional PVB polymer units, the molecular weight distribution of the PVB is desirably increased.

With respect to the lightly cross-linked PVB usable in the process of this invention, which, to the best of present knowledge, was not known prior to the present invention, as far as the chemical reaction of a cross-linking agent with PVOH to produce intermolecular linkages is concerned, there are no limitations on the choice of cross-linking agent as long as it contains active groups capable of inter-acting with a pair of hydroxyl groups on each of two neighboring PVOH molecular chains to form stable intermolecular linkages which are retained through the polymer melting and extruding operation employed in forming the plasticized PVB sheet. Intra-acetal linkages occuring through hydroxyl groups on the same PVB chain are representative of unstable linkages considered to rupture during sheet-shaping and, if exclusively present, are not considered within the scope of this invention. With the foregoing in mind, the chemical structure of the cross-linking agent is not of consequence in the intended function of sheet formation from the modified PVB resin. Operable cross-linking agents include diepoxides such as diglycidyl ether bisphenol A; aldehydes containing at least two CHO groups such as dialdehydes and trialdehydes and the like. The preferred cross-linking agents are dialdehydes, for example oxaldehyde and the more complex dialdehydes, and trialdehydes containing aliphatic (with or without unsaturation), aromatic or mixed aliphatic-/aromatic groups between carbonyl linkages of the CHO groups. Specific functional dialdehydes include aliphatic aldehydes such as propanedial, succinaldehyde, adipaldehyde, 2-hydroxyhexanedial, etc.; aromatic dialdehydes including phthalaldehyde, 1,4 benzenediacetaldehyde, 4,4-(ethylenedioxy) dibenzaldehyde, 2,6-naphthalene dicarbaldehyde, etc. Operable trialdehydes include N,N',N"-(3,3',3"-trisformylethyl) isocyanurate and the like. Mixtures of the foregoing and other cross-linking agents are also suitable. Preferred dialdehydes are selected from the group consisting of glutaraldehyde, 4,4'(ethylenedioxy) dibenzaldehyde and 2-hydroxyhexanedial. The most preferred dialdehyde is glutaraldehyde.

The cross-linking reaction occurs substantially in conjunction with formation of the PVB resin through condensation of PVOH with butyraldehyde.

As one of the attributes of the invention, the concentration of cross-linking agent used in the cross-linking reaction can be conveniently varied depending on the extent of surface roughness desired in the extruded PVB sheet and this provides a versatile chemical process tool applicable to sheet fabrication. Such concentration should be adequate to lightly cross-link the PVB resin, by which is meant that the viscosity of such cross-linked resin is about 2% to about 85% greater than such viscosity in the absence of the intermolecular cross-linkages. Such viscosity of the lightly cross-linked PVB resin (7.5 weight percent solution in methanol at 20° C.) will be between about 90 cps (0.09 Pa.s to about 325 cps (0.325 Pa.s and preferably between about 150-260 cps (0.150-0.260 Pa.s. The concentration of cross-linking agent to provide these cross-linked PVB viscosities will broadly vary with the molecular weight of the cross-linking agent used, the higher the molecular weight of such agent, the greater the amount required. For the preferred di and trialdehydes, the concentration used should be between about 0.0005 to about 0.20 and preferably 0.01 to 0.04 parts per hundred parts of PVOH.

PVOH useful in forming the lightly cross-linked PVB for use in the process of this invention is the product of the acid or base catalyzed hydrolysis of a polyvinyl ester (usually polyvinyl acetate) which is suitable for the production of PVB by condensation with butyraldehyde. Such PVOH comprises products of a substantially complete as well as incomplete hydrolysis, the latter including those where hydrolysis is purposely stopped short of completion. PVB resin made from such products of incomplete hydrolysis differ in the residual content of polyvinyl ester. Useful PVOH's can contain residues of unhydrolyzed vinyl ester in their molecules in amounts up to 5% by weight (calculated as polyvinyl acetate), although amounts on the order of about 0 to 2.5% by weight of polyvinyl acetate are preferred when the PVB resin is to be used in making interlayer sheeting for safety glass. Blends of individual grades of different viscosities can be used.

Lightly cross-linked PVB resin for use in this invention is produced by known aqueous or solvent acetalization processes wherein the PVOH hydrolysis product is reacted with butyraldehyde in the presence of an acid catalyst to produce PVB, followed by neutralization of the catalyst, separation, stabilization and drying of the PVB resin. Depending on its rate of reaction, the cross-linking agent is added to the catalyzed condensation reaction mixture before or simultaneously with the butyraldehyde. In a solvent system, the sequence of addition may be somewhat different; for example, it may be necessary to add the cross-linking agent after the PVB is in solution.

In a solvent process, acetalization is carried out in the presence of sufficient solvent to dissolve the PVB formed and produce a homogeneous solution at the end of acetalization. The PVB is separated from solution by precipitation of solid particles with water which are then washed and dried. Solvents used are lower aliphatic alcohols such as ethanol.

In an aqueous process, acetalization is carried out by adding butyraldehyde to a water solution of PVOH at a temperature on the order of about 20° C., in the presence of an acid catalyst, agitating the mixture to cause an intermediate PVB to precipitate in finely divided form and continuing the agitation while heating until the reaction mixture has proceeeded to the desired end point.

Because of the relationship herein recognized between surface roughness of the extruded interlayer sheet and the polydispersity or molecular weight distribution (MWD) of the PVB of such sheet achieved through light cross-linking of such PVB, roughness can be controlled and conveniently tailored by adjusting the extent of cross-linking through the concentration of cross-linking agent used. For example, if the MWD of the PVB resin for forming the sheet is too narrow, the surface roughness of the extruded interlayer will be too high, whereas if the reverse is true and such molecular weight distribution is too broad, the extruded sheet roughness will be too low and shaping and deairing will be compromised. This invention then provides a chemical means for adjusting sheet surface roughness. This is achieved by lightly cross-linking the PVB resin to broaden the molecular weight distribution thereof which, after plasticization and extrusion, produces an interlayer sheet of desired roughness level and which can be further subsequently adjusted in roughness level by judiciously adjusting the concentration of cross-linking agent used in association with the acetalization reaction. Molecular weight distribution (MWD) is measured by the ratio $\overline{M}_w/\overline{M}_n$ where $\overline{M}_w$ is the weight average molecular weight and $\overline{M}_n$ is the number average molecular weight.

The mechanism by which the sheet surface roughness is affected by the light cross-linking of the PVB is not completely understood and it is not wished to be bound by any particular theory. It is hypothesized, however, that the more rubbery the polymer the greater will be its tendency to retract on itself to provide a given surface roughness on exiting the extrusion die. Increasing the MWD through the light cross-linking of the invention will provide a stiffer, less elastic polymer which will have a reduced tendency to retract on exiting the die thereby producing a lower sheet surface roughness level.

The melt viscosity of the lightly cross-linked PVB resin in combination with the surface roughness of the extruded sheet optimally should together be adequate to facilitate ease of handling and deairing the extruded interlayer during lamination. Such viscosity at 120° C. and 1 hertz will be between about 2.0 and about $3.5 \times 10^5$ poise (0.20 to $0.35 \times 10^5$ Pa.s and preferably between about 2.50 and about $3.05 \times 10^5$ poise (0.250 and $0.305 \times 10^5$ Pa.s. When sheet roughness is in the form of a multitude of minute peaks and valleys in one or both surfaces it can be characterized by an average value of between about 60 to about $180 \times 10^{-5}$ inch (152 to $452 \times 10^{-5}$ cm) and preferably between about 120 to about $150 \times 10^{-5}$ inch (305 to $381 \times 10^{-5}$ cm) for the depths of individual valleys in a representative area of the sheet. A device for measuring such depths is described hereinafter.

The lightly cross-linked PVB resins of the invention have Staudinger molecular weights ranging from about 30,000 to 600,000 and preferably from 45,000 to 270,000 and may be considered to be made up on a weight basis, of from 5 to 30% hydroxyl groups, calculated as polyvinyl alcohol, 0 to 5% ester groups, calculated as polyvinyl ester, and the balance substantially butyral groups. The PVB resin preferably contains, on a weight basis, from 11 to 25% hydroxyl groups, calculated as polyvinyl alcohol, and from 0 to 2.5% acetate groups, calculated as polyvinyl acetate, the balance being substantially butyral groups.

In forming the extruded interlayer sheet, the lightly cross-linked PVB resin must be plasticized with from about 20 to 80 parts plasticizer per hundred parts of resin and more commonly between 25 and 45 parts for conventional laminated safety glass use. This latter concentration is generally used with polyvinyl butyrals containing 17 to 25% vinyl alcohol by weight. In general, plasticizers commonly employed are esters of a polybasic acid or a polyhydric alcohol. Particularly suitable plasticizers are triethylene glycol di-(2-ethyl butyrate), dihexyl adipate, dioctyl adipate, mixtures of heptyl and nonyl adipates, dibutyl sebacate, polymeric plasticizers such as the oil-modified sebacid alkyds, and mixtures of phosphates and adipates such as are disclosed in U.S. Pat. No. 3,841,890 and adipates and alkyl benzyl phthalates such as disclosed in U.S. Pat. No. 4,144,217. Other suitable plasticizers are well known or will be obvious to those skilled in the art.

The extruded interlayer formed from plasticized, lightly cross-linked PVB resin according to this invention can be prepared with systems known to those skilled in the art by extrusion through a conventional sheeting die having water cooled die lips, i.e. by forcing molten polymer through a horizontally long, vertically narrow die opening substantially conforming in length and width to that of the sheet being formed therein, or by using a die roll system, i.e. by casting the molten polymer issuing from an extrusion die onto a specially prepared surface of a die roll positioned in close proximity to the exit of such die which imparts the desired surface characteristics to one side of the molten polymer. Thus, when the surface of such roll has minute peaks and valleys, sheet formed of polymer cast thereon will have a rough surface on the side which contacts the roll which generally conforms respectively to the valleys and peaks of the roll surface. Further details of construction of such a die roll are disclosed in U.S. Pat. No. 4,035,549, col. 3, line 46 through col. 4, line 44, the content of which is incorporated herein by reference.

A rough surface on the other side of the extruded interlayer formed in a die roll extrusion system can be provided by the design of the die opening through which the extrudate passes. Such a die opening configuration is generally shown in FIG. 4 of U.S. Pat. No. 4,281,980, the content of such figure being incorporated herein by reference. When the outermost end portion of die lip 5 in such figure in the direction of extrusion is parallel with a tangent to the surface of the opposing rotating die roll, and the remaining rearward portion of such lip is at an angle of between about 2 to 7 degrees with such tangent, a rough surface will automatically be generated on the side of the extruded interlayer which is opposite to that formed by the die roll surface.

In addition to plasticizers, interlayers according to this invention may contain other additives such as dyes, ultraviolet light stabilizers, salts to control adhesion and antioxidants and may, if desired, be treated with additives to improve laminating efficiency.

The following procedures were used in obtaining the values for the various properties presented in the Tables following:

Number average molecular weight ($\overline{M}_n$) and weight average molecular weight ($\overline{M}_w$) PVB were measured by gel phase chromatography with low angle laser light scattering in a solution of tetrahydrofuran (10 mg of PVB per millileter of THF). Further information is in Polymer Preprints, Vol. 23 (1982), page 35 in a paper by P. Metzger Cotts and A. C. Ouano.

Melt or complex viscosity of the plasticized PVB with a Rheometric Mechanical Spectrometer at a frequency of 1 hertz. The sample was placed between two parallel plates oscillating at such frequency.

Viscosity by a capillary tube viscometer -Cannon Fenske #400.

Extruded interlayer roughness ($R_z$) with a profilometer such as Model C59 Perthometer from Mahr Gage Co., New York. $R_z$ is obtained directly by moving the stylus back and forth across the rough surface and constitutes an average value of the individual roughness depths in five sequential measuring lengths $1_e$ of 0.8 mm.

The invention is further described with reference to the following examples which are for illustration only and are not intended to imply any limitation or restriction on the invention. Unless otherwise indicated, all quantities are expressed by weight.

EXAMPLES 1–4

Polyvinyl alcohol (PVOH) resin having a residual polyvinyl acetate content of less than 2% was dissolved with agitation in water at 90°-95° C. to form an 8% solution, 5524 Kg of this PVOH solution was charged to an agitated, reactor and its temperature adjusted to 18° C. To this solution was added 267 Kg of butyraldehyde and various amounts (See Table 1 following) of a 50% aqueous solution of glutaraldehyde which decreased the temperature to about 16° C. 16 kg of a 35% water solution of nitric acid was then charged and the mixture held for 1.25 h at between 16° and 20° C. A second charge of 46.5 kg of nitric acid was added 1 h after the initial nitric acid charge. After 1.25 h the mixture was heated over 2 h to 75° C. and held thereat for 2.5 h. The contents of the reactor was washed with water at 75° C. to a pH of 4.0. Potassium hydroxide water solution was then charged to provide a pH of 9.5-10.5 and the contents held at this pH for 3 h. at 75° C. Additional water at 75° C. was then added to decrease the pH to 7.5. The PVB slurry was centrifuged and dried to less than 2% moisture. The viscosity and molecular weight distribution of the dried PVB resin were measured and the following results were obtained:

TABLE 1

| Ex. | Glutaraldehyde Wt/per cwt of PVOH | PVB viscosity (cps) | (Pa.s) | PVB MWD* |
|---|---|---|---|---|
| 1 | 0 | (175) | (0.175) | 2.14 |
| 2 | 0.07 | (208) | (0.208) | 2.36 |
| 3 | 0.11 | (267) | (0.267) | 2.47 |
| 4 | 0.14 | (306) | (0.306) | — |

*MWD = Molecular Weight Distribution = $\overline{M}_w/\overline{M}_n$

The foregoing results in Table 1 illustrate the preparation of PVB lightly crosslinked through diacetal intermolecular linkages achieved through the presence of different concentrations of glutaraldehyde as the cross-linking agent in the acetalization of PVOH with butyraldehyde. That cross-linking occurred is shown by the 19%, 53% and 75% increases in the viscosity of the PVB occurring when the minor amounts of glutaraldehyde were used in Examples 2, 3 and 4 in comparison with that of control Example 1. The higher values for MWD in Examples 2 and 3 in comparison with Example 1 indicate a broadening of the molecular weight distribution of the PVB as a result of the diacetal intermolecular cross-links provided through use of the glutaraldehyde.

EXAMPLES 5-7

These Examples illustrate preparation of a plasticized sheet made from lightly crosslinked PVB.

32.0 parts of dihexyl adipate plasticizer were mixed with 100 parts of the PVB resin of Examples 1, 2 and 4 in a high intensity mixer. The plasticized PVB resin was then melted in an extruder and forced in melt form through a die opening onto the surface of an adjacent rotating die roll of the type previously described which had internal cooling means which regulated the temperature of a die blade in contact with the polymer melt at about 104° C. The melt was at 190° C. and the pressure of the die was 2411-2756 kPa. The extruded sheet had a thickness of about 0.8 mm and issued from the die roll at about 4.5 m per minute. The die lip of the die opening as previously described was formed with a compression angle of about 4 degrees. Each side of the extruded sheet was formed with a rough surface. The roughness of the side opposite that in contact with the die roll was measured and the results obtained, along with the melt viscosity of the PVB resin are tabulated in Table 2.

TABLE 2

| Ex. | Glutaraldehyde Used in Making PVB Wt/per cwt of PVOH | Roughness (R$_z$) (cm × 10$^{-5}$) (in × 10$^{-5}$) | Melt Viscosity 120° C. (Pa.s)(10$^5$) | (p) (10$^5$) |
|---|---|---|---|---|
| 5 | 0 | (889) (350) | 0.280 | 2.80 |
| 6 | 0.07 | (368) (145) | 0.300 | 3.00 |
| 7 | 0.14 | (203) (80) | 0.306 | 3.06 |

The foregoing results in Table 2 illustrate preparation of plasticized PVB sheet lightly cross-linked through stable diacetal intermolecular linkages achieved through the presence of glutaraldehyde as the cross-linking agent in forming the PVB from which the sheet was formed. That the cross-links survived extrusion in forming the sheet from the melt is shown by the increased melt viscosity levels obtained with the cross-linked PVB (Examples 6 and 7) in comparison with the uncross-linked control of Example 5.

Also illustrated is the method of the invention for regulating the surface roughness of the extruded, plasticized PVB sheet. Using the lightly cross-linked PVB of Examples 6 and 7 progressively reduced the sheet roughness from that of Example 5 made using uncross-linked PVB.

EXAMPLE 8

This Example illustrates preparation of a lightly cross-linked PVB using a dialdehyde containing a mixture of aliphatic and aromatic groups between carbonyl end groups of the dialdehyde.

1250 g. of the PVOH solution used in Examples 1-4 was charged to an agitated, fluted reactor and 3.8 ml. of nitric acid and 0.17 g of 4,4'(ethylenedioxy)dibenzaldehyde, i.e.

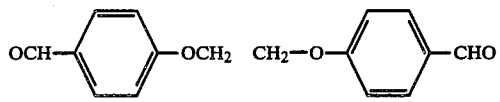

added thereto. This dialdehyde was obtained commercially from Aldrich Chemical Company of Milwaukee, Wis. The reaction mixture was heated to 90° C. over 40 min. and held at 90° C. for 40 min. The solution was then cooled to 20° C. and 67.8 g of butyraldehyde was quickly added with agitation. The reaction mixture was held at this temperature for 40 min. and then heated to 75° C. over a period of 20 min. The remaining conditions and treatment of the resulting product were identical to those described in Examples 1-4. The viscosity of the lightly cross-linked PVB resin obtained was 220 cps (0.220 Pa.s which is about 26% greater than that of the uncross-linked control of Example 1. The sequential cross-linking of the PVOH followed by acetalization with butyraldehyde was necessary because of the reduced reactivity of the molecularly larger, bulkier dialdehyde of this Example. It is believed that a plasticized PVB sheet could be formed from this cross-linked PVB and the surface roughness thereof regulated by following the procedure of Examples 5-7.

EXAMPLE 9

This Example illustrates preparation of a lightly cross-linked PVB using a long chain aliphatic dialdehyde containing a substituted hydroxyl between carbonyl end groups of the dialdehyde.

The procedure of Example 8 was repeated except that 0.33 g of a 25% aqueous solution of 2-hydroxyhexanedial from Aldrich Chemical Company, i.e.

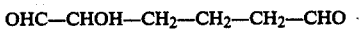

OHC—CHOH—CH$_2$—CH$_2$—CH$_2$—CHO was added to the PVOH-nitric acid mixture instead of the dialdehyde used in Example 8. The reaction mixture was held at 90° C. for 30 min. before cooling to 20° C. Butyraldehyde (67.8 g) was then added as in Example 8 and the reaction mixture held at 20° C. for 52 min. before heating to 75° C. The remaining reaction conditions and treatment of the resulting product were identical to those described in Example 8. The viscosity of the cross-linked PVB resin obtained was 318 cps (0.318 Pa.s) which is about 82% greater than that of the uncross-linked control of Example 1. It is believed that a plasticized PVB sheet could be formed from this cross-linked PVB and the surface roughness thereof controlled by following the procedure of Examples 5–7.

EXAMPLE 10

This Example illustrates preparation of a cross-linked PVB using a trialdehyde to cross-link the intermolecular PVOH chains.

The procedure of Example 8 was repeated except that 0.36 g of a 50% aqueous solution of N,N',N''-(3,3',3''tris formylethyl) isocyanate prepared according to U.S. Pat. No. 4,293,693, i.e.

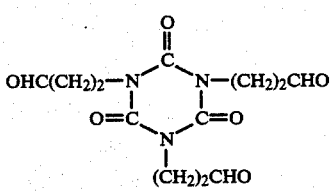

was added to the PVOH-nitric acid mixture instead of the dialdehyde used in Example 8. The remaining procedure, temperatures and amounts of constituents were identical to Example 8. The viscosity of the PVB resin obtained was 300.5 cps (0.3005 Pa.s which is about 72% greater than that of the uncross-linked control of Example 1. It is believed that a plasticized PVB sheet could be formed from this cross-linked PVB and the surface roughness thereof controlled by following the procedure of Examples 5–7.

EXAMPLE 11

This Example illustrates preparation of a lightly cross-linked PVB using a diepoxide.

The procedure of Example 8 was repeated except that 0.4 g of diglycidyl ether bisphenol A, available from Miller Stephenson Co., Danbury, Conn., was used instead of the dialdehyde of Example 8. The viscosity of the lightly cross-linked PVB resin obtained was 264 cps (0.264 Pa.s which is about 52% greater than that of the uncross-linked control of Example 1. It is believed that a plasticized PVB sheet could be formed from this cross-linked PVB and the surface roughness thereof controlled by following the procedure of Examples 5–7.

EXAMPLE 12

This Example illustrates preparation of a lightly cross-linked PVB using a titanate.

The procedure of Example 8 was repeated except that 1.7g of tetraisopropyl titanate, available from Kenrich Petrochemical Co., Inc. of Bayonme, N.J. as KR-38S, was used instead of the dialdehyde of Example 8. The viscosity of the lightly cross-linked PVB obtained was 208 cps (0.208 Pa.s which is about 19% greater than that of the uncross-linked control of Example 1. It is believed that a plasticized PVB sheet could be formed from this cross-linked PVB and the surface roughness thereof controlled by following the procedure of Examples 5–7.

EXAMPLE 13

This Example illustrates preparation of a lightly cross-linked PVB using a polyepoxide.

The procedure of Example 8 was repeated except that 2.86 g of a polyepoxide available from Monsanto Company as Santo-Res ® 31, was used instead of the dieldehyde of Example 8. Santo-Res ® 31 is a polyepoxide formed by condensing the hydrohalide salt of a polyamine with epichlorohydrin as explained in U.S. Pat. No. 4,129,528. The viscosity of the lightly cross-linked PVB obtained was 194 cps (0.194 Pa.s. This procedure was repeated with 5.72g of the polyepoxide and instead of holding the acetalization mixture at 75° C. it was held at 95° C. for 1 h. The viscosity of the resulting lightly cross-linked PVB obtained was 216 cps (0.216 Pa.s) which is about 23% greater than that of the uncross-linked control of Example 1. It is also believed that a plasticized PVB sheet could be formed from this cross-linked PVB and the surface roughness thereof controlled by following the procedure of Examples 5–7.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A method of regulating the surface roughness of extruded, plasticized polyvinyl butyral sheet which comprises employing during extrusion a polyvinyl butyral resin lightly cross-linked through stable intermolecular linkages.

2. The method of claim 1 wherein the roughness is determined by a value of about $60 \times 10^{-5}$ to about $180 \times 10^{-5}$ inch.

3. The method of claim 2 wherein said roughness is determined by a value of about $120 \times 10^{-5}$ to $150 \times 10^{-5}$ inch.

4. The method of claim 1, 2, or 3 wherein such sheet is formed using a sheeting die or a die roll extrusion system.

5. A method of regulating the surface roughness of extruded, plasticized polyvinyl butyral sheet which comprises employing during extrusion a polyvinyl butyral resin lightly cross-linked through diacetal intermolecular linkages developed prior to extrusion through an aldehyde containing at least two aldehyde groups, such surface roughness being reduced over that which would be obtained employing a polyvinyl butyral resin which had not been lightly cross-linked.

6. The method of claim 5 wherein the diacetal linkages are developed through a trialdehyde or a dialdehyde containing an aliphatic or an aromatic group or a mixture of aliphatic and aromatic groups between carbonyl groups.

7. The method of claim 6 wherein the diacetal linkages are developed through a dialdehyde selected from the group consisting of gluteraldehyde, 4,4'(ethylendioxy)dibenzaldehyde and 2-hydroxyhexanedial.

8. The method of claim 7 wherein the dialdehyde is gluteraldehyde.

9. The method of claim 5, 6, 7 or 8 wherein the viscosity of the polyvinyl butyral before plastization was about 2% to about 85% greater than its viscosity in the absence of such diacetal linkages.

10. The method of claim 9 wherein the polyvinyl butyral, after plastization, had a melt viscosity at 120° C. of between about $2.5 \times 10^5$ and about $3.5 \times 10^5$ poise.

11. The method of claim 10 wherein the roughness is determined by a value of about $60 \times 10^{-5}$ to about $180 \times 10^{-5}$ inch.

12. The method of claim 11 wherein said roughness is determined by a value of about $120 \times 10^{-5}$ to $150 \times 10^{-5}$.

13. The method of claim 12 wherein such sheet is formed using a sheeting die or die roll extrusion system.

* * * * *